United States Patent [19]
Kirsch et al.

[11] Patent Number: 5,468,017
[45] Date of Patent: Nov. 21, 1995

[54] AUTO IGNITION PACKAGE FOR AN AIR BAG INFLATOR

[75] Inventors: Thomas A. Kirsch; Lloyd G. Green, both of Mesa, Ariz.

[73] Assignee: TRW Inc., Lyndhurst, Ohio

[21] Appl. No.: 323,630

[22] Filed: Oct. 17, 1994

[51] Int. Cl.⁶ .................................................. B60R 21/26
[52] U.S. Cl. ........................................................ 280/741
[58] Field of Search ............................... 280/741, 736, 280/737; 422/164, 165; 102/530, 531, 481

[56] References Cited

U.S. PATENT DOCUMENTS

| | | | |
|---|---|---|---|
| 3,944,251 | 3/1976 | Lynch | 102/531 |
| 4,561,675 | 12/1985 | Adams et al. | 280/741 |
| 4,858,951 | 8/1989 | Lenzen | 280/741 |
| 4,944,528 | 7/1990 | Nilsson et al. | 280/741 |
| 5,100,174 | 3/1992 | Jasken et al. | 280/741 |
| 5,131,679 | 7/1992 | Novak et al. | 280/736 |
| 5,186,491 | 2/1993 | Yoshida et al. | 280/741 |
| 5,253,895 | 10/1993 | Bretfeld et al. | 280/736 |
| 5,275,433 | 1/1994 | Klober et al. | 280/741 |
| 5,299,828 | 4/1994 | Nakajima et al. | 280/741 |
| 5,346,254 | 9/1994 | Esterberg | 280/741 |
| 5,380,039 | 1/1995 | Emery et al. | 280/742 |

Primary Examiner—Margaret A. Focarino
Assistant Examiner—Paul N. Dickson
Attorney, Agent, or Firm—Tarolli, Sundheim & Covell

[57] ABSTRACT

An inflator (10) for inflating an air bag (12) includes an outer housing (40). A hermetically sealed canister (90) containing disks (110) of gas generating material is located in the outer housing (40). The canister (90) also contains an annular auto ignition packet (150) containing an auto ignition material (164) having an ignition temperature below the ignition temperature of gas generating material in disks (110). The auto ignition packet (150) extends around a base (138) of an igniter (99). The auto ignition packet (150) is disposed adjacent to a lower end wall (46) of the inflator housing (10) opposite from an end wall across which the folded air bag extends. Consequently, the air bag does not insulate the auto ignition packet (150) from the interior of the vehicle in which the inflator is disposed.

26 Claims, 3 Drawing Sheets

AUTO IGNITION PACKAGE FOR AN AIR BAG INFLATOR

BACKGROUND OF THE INVENTION

1. Technical Field

The present invention relates to an apparatus for restraining an occupant of a vehicle, and particularly relates to an inflator for an inflatable vehicle occupant restraint.

2. Description of the Prior Art

An inflator for an inflatable vehicle occupant restraint, such as an air bag, includes a housing containing a source of inflation fluid. The source of inflation fluid may include an ignitable gas generating material. The inflator is actuated when the vehicle experiences a condition that indicates the occurrence of a collision for which inflation of the air bag is desired. The collision-indicating condition may comprise, for example, the occurrence of a predetermined amount of vehicle deceleration.

The inflator for an air bag commonly includes an igniter having igniter material which ignites when the igniter is actuated. Ignition of the igniter material ignites the gas generating material. The gas generating material, when ignited, generates gas for inflating the air bag. The gas generating material typically ignites and burns at a temperature of about 650° F. or higher.

The inflator may on occasion be subjected to an abnormally high temperature. For example, if a vehicle is involved in a fire, the temperature in the vehicle adjacent the inflator may reach or exceed 650° F. In such a situation, the gas generating material might be at a high enough temperature to ignite.

To avoid ignition of the gas generating material when the ambient vehicle temperature is excessively high, a quantity of auto ignition material is located within the inflator. The auto ignition material is specifically designed to ignite at a lower temperature than the temperature at which the gas generating material ignites. The typical auto ignition material ignites at around 350° F. When the auto ignition material ignites, the gas generating material is ignited. Thus, the gas generating material is ignited when the ambient temperature is about 350° F.

SUMMARY OF THE INVENTION

An improved apparatus for inflating an air bag includes an auto ignition packet located within an inflator housing. The auto ignition packet contains material having an ignition temperature below the ignition temperature of gas generating material disposed within the inflator housing. Upon exposure of the inflator housing to excessive heat, the auto ignition packet ignites the gas generating material.

The auto ignition packet may advantageously have an annular configuration. An igniter for the gas generating material extends through a central opening in the annular auto ignition packet. The auto ignition packet is disposed adjacent to an end wall of the inflator housing opposite from an end wall across which a folded and stored air bag extends. By having the auto ignition packet disposed adjacent to a wall of the inflator housing which is opposite from the air bag, heat is easily transmitted from the interior of a vehicle through the wall of the inflator housing to the auto ignition packet. This is because the auto ignition packet is not insulated from the interior of the vehicle by the air bag.

BRIEF DESCRIPTION OF THE DRAWINGS

Further features of the present invention will become apparent to those skilled in the art to which the present invention relates from reading the following specification with reference to the accompanying drawings, in which.

DESCRIPTION OF A PREFERRED EMBODIMENT OF THE INVENTION

Figure 1:
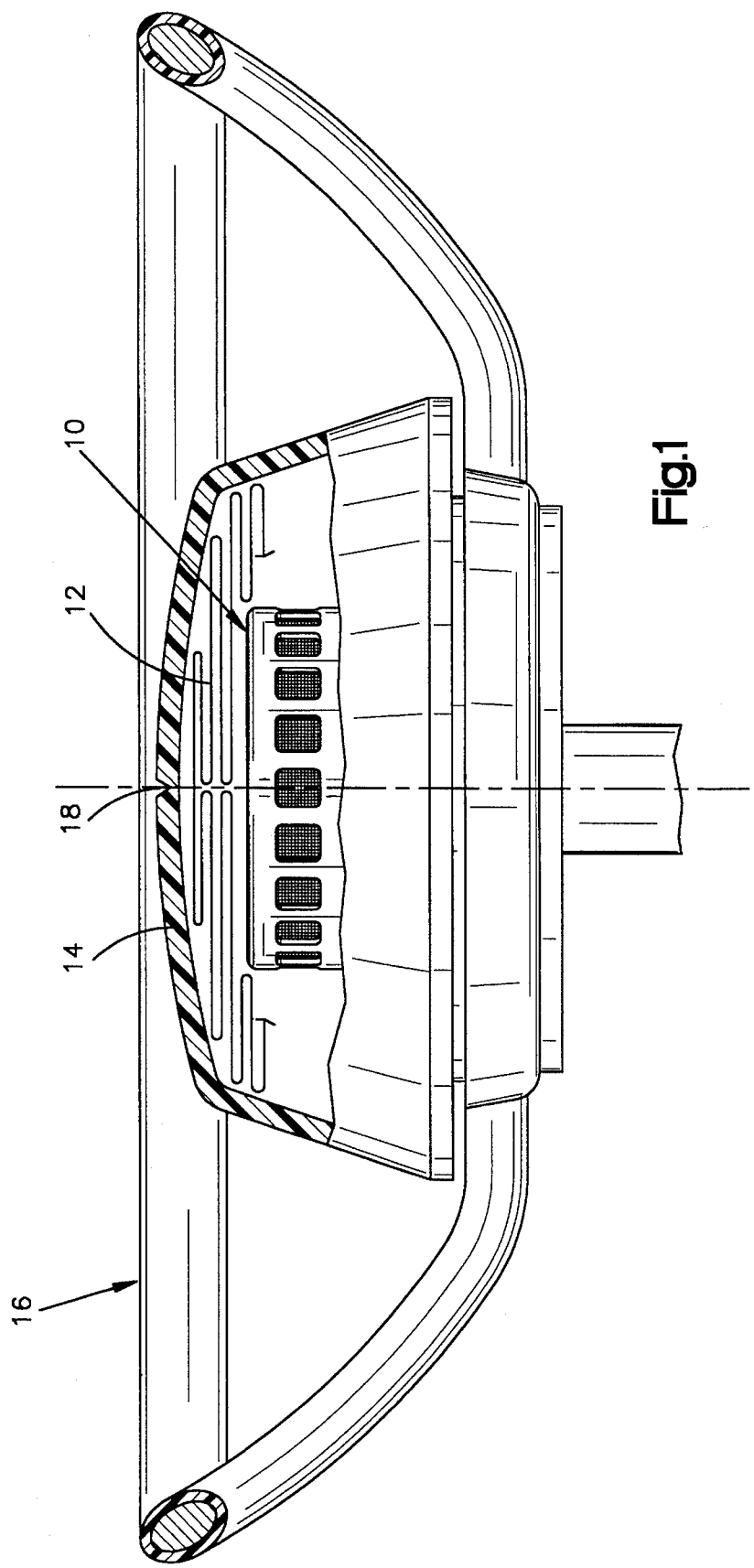
FIG. 1 is a transverse view, partially in section, of a vehicle steering wheel with an inflatable air bag module incorporating an inflator constructed in accordance with the present invention.

The present invention relates to an inflator for an inflatable vehicle occupant restraint, and particularly to an inflator for inflating an air bag to protect the driver of a vehicle. The present invention is applicable to various inflator constructions. As representative of the present invention, FIG. 1 illustrates an inflator 10. An inflatable vehicle occupant restraint comprising an air bag 12 is folded in a plurality of layers and extends across the upper end portion of the inflator 10. A cover 14 encloses the air bag 12 and the inflator 10. If desired, an additional covering could be provided for the folded air bag 12. The inflator 10, the air bag 12, and the cover 14 are components of a module which is mounted on a vehicle steering wheel 16.

Upon the occurrence of sudden vehicle deceleration, such as occurs in a collision, the inflator 10 is actuated and produces a volume of gas. The gas from the inflator 10 expands the air bag 12. As the air bag 12 starts to expand, it breaks weakened portions in the cover 14. One of the weakened portions is designated 18 in FIG. 1. As the air bag 12 continues to expand, it moves into the space between the driver of the vehicle and the steering wheel 16 to restrain movement of the driver, as is known.

Figure 2:
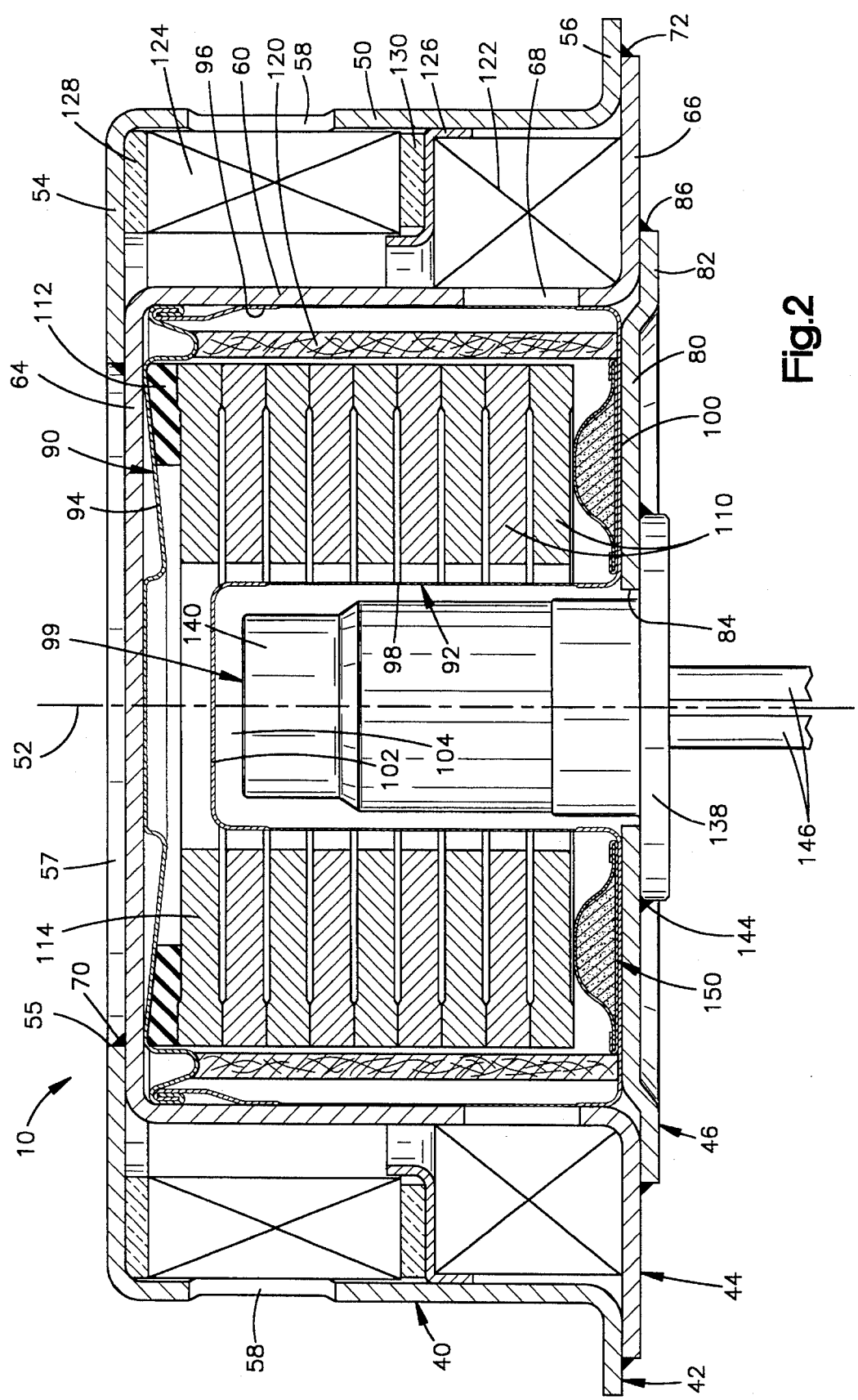
FIG. 2 is a transverse view, partially in section, of the inflator of FIG. 1.

The inflator 10 (FIG. 2) includes an outer housing 40. The housing 40 is made of three pieces, namely a diffuser cup 42, a combustion cup 44, and a combustion chamber cover or lower end wall 46. The diffuser cup 42, combustion cup 44, and lower end wall 46 are made of a metal, such as UNS S30100 stainless steel.

The diffuser cup 42 is generally cup-shaped and has a cylindrical diffuser cup side wall 50 extending around the central axis 52 of the inflator 10. The diffuser cup side wall 50 extends between a flat upper end wall 54 and a flat lower flange 56. An inner annular surface 55 on the flat upper end wall 54 of the diffuser cup 42 defines a central opening 57 in the upper end wall 54. The flat upper end wall 54 and the flat lower flange 56 are generally parallel to each other and perpendicular to the central axis 52. An annular array of gas outlet openings 58 extends circumferentially around an upper portion of the diffuser cup side wall 50. The openings 58 are illustrated as being a single row of generally rectangular openings. However, the openings 58 could be circular in shape and could be in two or more rows.

The combustion cup 44 is generally cup-shaped and is disposed inside the diffuser cup 42. The combustion cup 44 has a cylindrical side wall 60 extending around the axis 52. The cylindrical side wall 60 extends between a flat upper end wall 64 and a flat lower flange 66. The upper end wall 64 and the lower flange 66 are generally parallel to each other and perpendicular to the central axis 52. An annular array of openings 68 extends circumferentially around a lower portion of the combustion cup cylindrical side wall 60.

The upper end wall 64 of the combustion cup 44 is welded with a continuous weld to inner annular surface 55 on the upper end wall 54 of the diffuser cup 42 at a circumferential weld location 70, preferably by laser welding. The upper end wall 64 of the combustion cup 44 and the end wall 54 of the diffuser cup 42 cooperate to form an upper end wall of the inflator 10. The folded and stored air bag 12 (FIG. 1) overlies the upper end wall of the inflator 10. The combustion cup flat lower flange 66 is welded with a continuous weld to the diffuser cup flat lower flange 56 at a circumferential weld location 72, also preferably by laser welding.

The lower end wall 46 is a generally flat metal piece having a circular center portion 80 which extends parallel to and is spaced from the upper end wall 64 of the combustion cup 44. An annular outer flange 82 is axially offset from and extends radially outward of the center portion 80 of the lower end wall 46. A circular opening 84 is located in the circular center portion 80 of the lower end wall 46. The annular outer flange 82 of the lower end wall 46 is welded with a continuous weld to the combustion cup flat lower flange 66 at a circumferential weld location 86. This weld could be a penetration weld if desired.

A hermetically sealed canister 90 is disposed in the combustion cup 44. The canister 90 is made of two pieces, namely a lower canister section 92 and a canister cover 94. The radially outer edge of the canister cover 94 is crimped to an adjacent edge of the canister lower section 92 to seal the canister 90 hermetically. The canister 90 is preferably made of relatively thin aluminum.

The canister lower section 92 has a cylindrical outer side wall 96 adjacent to and inside the combustion cup cylindrical side wall 60. The cylindrical outer side wall 96 has a reduced thickness in the area adjacent the openings 68 in the combustion cup side wall 60. The canister lower section 92 also has a cylindrical inner side wall 98 spaced radially inwardly from the cylindrical outer side wall 96. The cylindrical inner side wall 98 has a reduced thickness in the area adjacent an igniter 99.

A flat annular lower end wall 100 of the lower canister section 92 interconnects the cylindrical outer side wall 96 and the cylindrical inner side wall 98. A circular inner top wall 102 of the lower canister section 92 extends radially inward from and caps the inner side wall 98. The circular inner top wall 102 and the cylindrical inner side wall 98 define a downwardly opening central recess 104 in the hermetically sealed canister 90. The igniter 99 extends into the central recess 104. Although the igniter 99 extends through the lower end wall 46 of the outer housing 40, the igniter is disposed outside of the canister 90.

A plurality of annular gas generating disks 110 are stacked atop each other within the hermetically sealed canister 90. An annular cushion 112 is disposed between the uppermost gas generating disk 114 and the inside of the canister cover 94. The gas generating disks 110 are made of a known material which ignites when heated to a temperature above 650° F. and generates nitrogen gas. Although many types of gas generating materials could be used, suitable gas generating materials are disclosed in U.S. Pat. No. 3,895,098.

The annular gas generating disks 110 are disposed in a coaxial relationship with the igniter 99 and with the cylindrical inner side wall 98 of the canister 90. The igniter 99 and the cylindrical inner side wall 98 of the canister 90 extend axially through central openings in some of the gas generating disks 110.

An annular prefilter 120 is disposed in the hermetically sealed canister 90. The annular prefilter 120 is located radially outward of the gas generating annular disks 110 and radially inward of the cylindrical outer side wall 96 of the hermetically sealed canister 90. A small annular space exists between the annular prefilter 120 and the cylindrical outer side wall 96.

An annular slag screen indicated schematically at 122 is located in the diffuser cup 42, outside of the combustion cup 44. The annular slag screen 122 is radially outward of the annular array of openings 68 and lies against the combustion cup cylindrical side wall 60. However, the slag screen 122 could be spaced away from the openings 68 in the combustion cup cylindrical side wall 60.

An annular final filter assembly indicated schematically at 124 is located inside the diffuser cup 42 above the annular slag screen 122. The annular final filter assembly 124 is radially inward of the gas outlet openings 58 in the side wall 50 of the diffuser cup 42. The annular final filter assembly 124 is a plurality of layers of various materials. The layers extend around the diffuser cup side wall 50 and are located inside the side wall. The detailed structure of the final annular filter assembly 124 does not form a part of the present invention and therefore will not be described in detail.

An annular filter shield 126 projects radially inwardly from the diffuser cup side wall 50 and separates the annular final filter assembly 124 and the annular slag screen 122. An annular graphite seal 128 seals the gap between the upper edge of the annular final filter assembly 124 and the inside of the diffuser cup flat upper end wall 54. Another annular graphite seal 130 seals the gap between the lower edge of the annular final filter assembly 124 and the upper side of the annular filter shield 126.

The igniter 99 projects through the circular opening 84 in the lower end wall 46 into the downwardly opening central recess 104 of the hermetically sealed canister 90. The igniter 99 is disposed in a coaxial relationship with the outer housing 40 and the canister 90. The igniter 99 has a base 138 which is welded with a continuous weld, preferably a laser weld, to the circular center portion 80 of the lower end wall 46 at a circumferential weld location 144. The igniter 99 has a thin metal casing 140 which ruptures upon actuation of the igniter to enable hot combustion products to escape from the igniter.

The igniter 99 is connected with a pair of wire leads 146 which extend outwardly from the igniter 99. The wire leads 146 are connectable to a collision sensor (not shown). The wire leads 146 are also connected to a resistance wire embedded in an ignition material in the igniter 99. The igniter 99 may be of any suitable well known construction. A thin plastic film (not shown) is located on the outside of the casing portion 140 of the igniter 99, to prevent metal-to-metal contact which could ground the igniter 99.

Upon the occurrence of a collision or other sudden vehicle deceleration for which inflation of the air bag is desired, the collision sensor closes an electrical circuit. An electrical current then flows through the wire leads 146 to the igniter 99. The resistance wire sets off the ignition material which ignites a charge in the igniter 99. Ignition of the charge in the igniter 99 forms hot gas products which flow outward from the igniter 99 and rupture the circular inner top wall 102 and the cylindrical inner side wall 98 of the hermetically sealed canister 90. The hot gas from the igniter 99 ignites the gas generating disks 110. The gas generating disks 110 rapidly produce a volume of another hot gas.

The pressure of the gas acts on the cylindrical outer side wall 96 of the hermetically sealed canister 90, forcing the cylindrical outer side wall 96 radially outward against the cylindrical side wall 60 of the combustion cup 44. This results in the thin cylindrical outer side wall 96 of the hermetically sealed canister 90 being ruptured or blown out at the annular array of openings 68 in the cylindrical side wall 60. The reduced thickness of the cylindrical outer side wall 96 adjacent the openings 68 allows this portion of the side wall 96 to rupture at a desired pressure in preference to other portions.

The gas generated by burning of the gas generating annular disks 110 then flows radially outward through the annular prefilter 120. The annular prefilter 120 removes from the flowing gas some combustion products of the igniter assembly 99 and of the gas generating annular disks 110. The prefilter 120 cools the flowing gas. When the gas cools, molten products such as metal are plated onto the prefilter 120. The gas flows through the annular array of openings 68 and into the annular slag screen 122.

The annular slag screen 122 removes and traps particles from the flowing gas. The slag screen also cools the flowing gas. When the gas cools, molten combustion products such as metal are plated onto the annular slag screen 122. The annular filter shield 126 between the annular slag screen 122 and the annular final filter assembly 124 causes turbulent flow of gas to occur in and around the annular slag screen 122. The turbulent gas flow promotes the retention of relatively heavy particles in the annular slag screen 122 and in the lower portion of the diffuser cup 42.

The gas flows axially upwardly from the annular slag screen 122 to the annular final filter assembly 124. The gas then flows radially outward through the annular final filter assembly 124 which removes small particles from the gas. The annular final filter assembly 124 also further cools the gas so that molten products in the gas may deposit on parts of the annular final filter assembly 124. The annular array of gas outlet openings 58 directs the flow of gas into the air bag 12 (FIG. 1) to inflate the air bag 12.

An auto ignition packet 150 (FIG. 2) constructed in accordance with the present invention is provided in the inflator 10. The auto ignition packet 150 is disposed within the canister 90 in flat abutting engagement with the annular lower end wall 100 of the canister 90. The lower end wall 100 of the canister 90 is disposed in flat abutting engagement with the flat circular center portion 80 of the lower end wall 46 of the outer housing 40.

Figure 3:
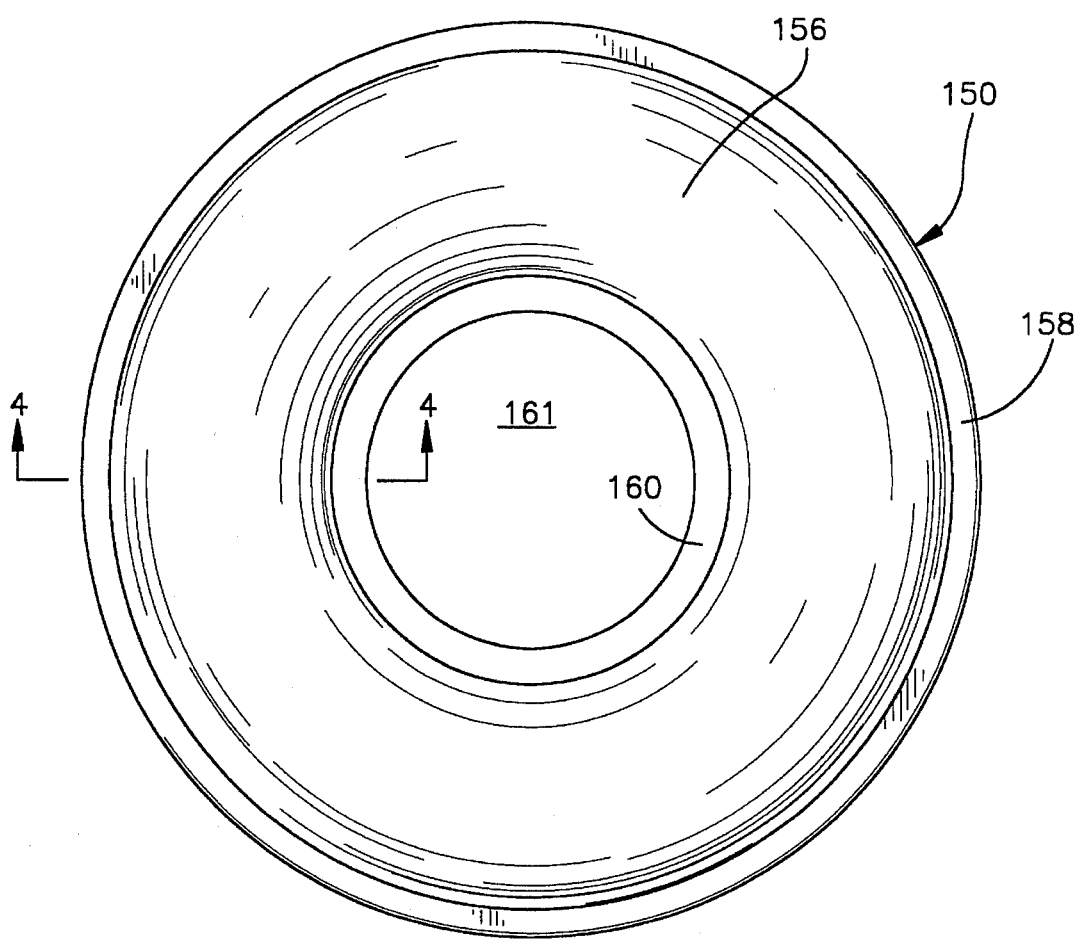
FIG. 3 is a plan view of a part used in the inflator of FIG. 2.
Figure 4:
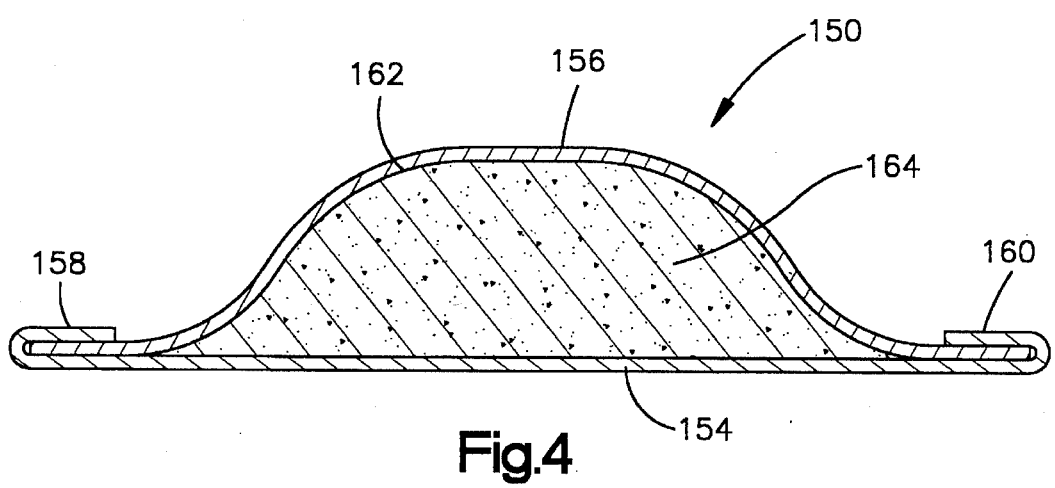
FIG. 4 is a sectional view taken along line 4—4 of FIG. 3.

The auto ignition packet 150 has an annular configuration (FIG. 3) and is disposed in a coaxial relationship with the igniter 99 and the gas generating disks 110. The auto ignition packet 150 includes a flat annular lower layer 154 (FIG. 4) and an annular upper layer 156. The upper and lower layers 154 and 156 are interconnected by a circular outer connection 158 (FIGS. 3 and 4) and a circular inner connection 160. A circular central opening 161 extends through the auto ignition packet 150.

The upper and lower layers 154 and 156 cooperate to define an annular chamber 162. The annular chamber 162 contains an auto ignition material 164. Although the auto ignition material 164 could have many different compositions, the auto ignition material is preferably a stabilized nitrocellulose composition such as IMR 4895, which ignites at about 350° F. This specific auto ignition material is produced by E. I. DuPont de Nemours & Co. The auto ignition material 164 may also include an ignition enhancer such as $BKNO_3$.

The auto ignition material 164 has an ignition temperature which is below the ignition temperature of the material of the gas generating disks 110. The gas generating disks 110 ignite at a temperature which is greater than 650° F. while the auto ignition material 164 ignites at a temperature of approximately 350° F. A different auto ignition material having a different ignition temperature could be utilized. However, the ignition temperature of the auto ignition material 164 should be below the ignition temperature of the material of the gas generating disks 110.

The upper and lower layers 156 and 154 of the auto ignition packet 150 are formed of a metal which can be readily shaped and has good thermal conductivity. In the embodiment of the invention illustrated in FIG. 4, the upper and lower layers 156 and 154 are formed of aluminum having a thickness of approximately 0.003 inches. A different material and/or a different material thickness could be utilized if desired.

The lower layer 154 of the auto ignition packet 150 is planar and is disposed in flat abutting engagement with the lower end wall 100 of the canister 90. The lower end wall 100 of the canister 90 is disposed in flat abutting engagement with the lower end wall 46 of the outer housing 40. Therefore, heat is conducted through the outer housing 40 and canister 90 to the auto ignition packet along a path formed entirely of metal.

The inner and outer connections 160 and 158 interconnect the lower and upper layers 154 and 156 of the auto ignition packet 150. In the illustrated embodiment of the auto ignition packet 150, the outer connection 158 and the inner connection 160 are formed by folding the material of the lower layer 154 over the material of the upper layer 156 and crimping the two layers together to form a secure mechanical interconnection.

It is contemplated that the outer connection 158 and inner connection 160 between the lower layer 154 and upper layer 156 of the auto ignition packet 150 could be formed in many different ways. For example, the outer and inner connections 158 and 160 could be formed by ultrasonic welding or by the use of a suitable tape and/or adhesive.

The auto ignition packet 150 is disposed in the inflator 10 at a location adjacent to the lower end wall 46 of the outer housing 40. The gas generating disks 110 are disposed adjacent to a side of the auto ignition packet 150 opposite from the lower end wall 46 of the outer housing 40. The folded layers of the air bag 12 (FIG. 1) extend across the upper end wall 64 of the combustion cup 44.

A heat flow path from an outer side surface of the lower end wall 46 of the outer housing to the auto ignition material is formed entirely of metal. Thus, heat is conducted through the metal lower end wall 46 of the outer housing 40, the metal lower end wall 100 of the canister 90 and the metal lower layer 154 of the auto ignition packet 150 to the auto ignition material 164.

When the interior of a vehicle in which the inflator 10 is disposed is heated to an excessive temperature, that is to a temperature above 350° F., the heat is easily conducted through the lower end wall 46 of the outer housing 40 to the auto ignition packet 150. Since the layers of the folded and stored air bag 12 (FIG. 1) extend across the upper end wall of the outer housing 40 of the inflator 10 and are spaced from the lower end wall 46 of the outer housing, the air-bag does not insulate the auto ignition packet 150 from the heat in the vehicle. Since the metal lower end wall 46 of the outer housing 40 and the metal end wall 100 of the canister 90 are good conductors of heat, almost as soon as the interior of the vehicle reaches the temperature of 350° F., the auto ignition packet 150 reaches the same temperature.

As soon as the auto ignition packet 150 reaches a temperature of 350° F., the auto ignition material 164 (FIG. 4) in the auto ignition packet 150 ignites. This results in hot combustion products being discharged from the auto ignition packet 150 to initiate burning of the gas generating disks 110.

The igniter 99 extends through the central opening 161 in the auto ignition packet 150. The auto ignition packet 150 extends around the base 138 of the igniter 99. The relatively thin casing 140 on the igniter 99 is spaced from the auto ignition packet 150. Therefore, actuation of the auto ignition packet 150 does not necessarily result in ignition of combustible material in the igniter 99. If the auto ignition packet 150 was more closely adjacent to the relatively thin casing 140 on the igniter 99, actuation of the auto ignition packet 150 would more often result in sufficient heat to effect ignition of combustible materials in the igniter 99.

If the igniter 99 is ignited immediately upon ignition of the auto ignition packet 150, the gas generating disks 110 are ignited in a more rapid manner and the volume of combustion products and pressure in the inflator 10 are high. In a situation in which heat is conducted from the interior of the vehicle to activate the auto ignition packet 150, it is desirable to minimize the amount of combustion products and the pressure in the inflator 10. By locating the auto ignition packet 150 around the base of the igniter 99 the igniter is less often actuated upon ignition of the auto ignition packet.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for inflating an inflatable vehicle occupant restraint, said apparatus comprising:

a housing;

gas generating material within said housing to provide gas to inflate the inflatable vehicle occupant restraint when said gas generating material is ignited; and an annular auto ignition packet within said housing, said annular auto ignition packet containing material having an ignition temperature below an ignition temperature of said gas generating material.

2. An apparatus as set forth in claim 1 wherein said housing has a first end wall which is disposed adjacent to the inflatable vehicle occupant restraint prior to inflation of the inflatable vehicle occupant restraint and a second end wall which is opposite to said first end wall, said annular auto ignition packet being disposed adjacent to said second end wall.

3. An apparatus as set forth in claim 2 further including an igniter connected with said second end wall and projecting into said housing toward said first end wall, said igniter extending along an axis through a central opening in said annular auto ignition packet, said annular auto ignition packet being annular about said axis.

4. An apparatus as set forth in claim 1 wherein said annular auto ignition packet includes a first annular metal layer, a second annular metal layer which cooperates with said first annular metal layer to form an annular chamber, and connector means for interconnecting the first and second annular metal layers, said material having an ignition temperature below the ignition temperature of said gas generating material being disposed in said annular chamber.

5. An apparatus as set forth in claim 1 further including an igniter connected with said housing and actuatable to ignite said gas generating material, said igniter extending along an axis through a central opening in said annular auto ignition packet, said annular auto ignition packet being annular about said axis.

6. An apparatus comprising:

a housing having a first end wall and a second end wall opposite from said first end wall;

an air bag connected with said housing and folded in a plurality of layers which extend across said first end wall of said housing, said first end wall of said housing being located between said second end wall of said housing and said plurality of layers of said air bag which extend across said first end wall of said housing;

gas generating material disposed within said housing to provide gas to inflate said air bag when said gas generating material is ignited; and an auto ignition packet, said auto ignition packet containing material having an ignition temperature below the ignition temperature of said gas generating material, said auto ignition packet being disposed within said housing between said gas generating material and said second end wall of said housing wherein heat is conducted through said second end wall of said housing to said auto ignition packet without being conducted through said plurality of layers of said air bag and without being conducted through said gas generating material.

7. An apparatus as set forth in claim 6 further including an igniter attached to said second end wall of said housing and actuatable to ignite said gas generating material.

8. An apparatus as set forth in claim 6 wherein said second end wall of said housing is formed of metal, said ignition packet including a layer of metal disposed between said second end wall of said housing and the material having an ignition temperature below the ignition temperature of the gas generating material to enable heat to be conducted from an outer side surface of said second end wall of said housing to the material having an ignition temperature below the ignition temperature of the gas generating material along a heat flow path formed entirely of metal.

9. An apparatus as set forth in claim 6 further including an igniter connected with said second end wall of said housing and actuatable to ignite said gas generating material, said igniter including a base connected with said second end wall of said housing and a casing connected with said base and formed of material which is ruptured to release hot combustion products upon actuation of said igniter, said auto ignition packet extending around said base of said igniter.

10. An apparatus as set forth in claim 6 wherein said auto ignition packet includes a first metal layer, a second metal layer which cooperates with said first metal layer to form a chamber to hold the material having an ignition temperature below the ignition temperature of said gas generating material, and connector means for interconnecting said first and second metal layers.

11. An apparatus as set forth in claim 10 wherein said housing includes an outer housing having surface means for defining a plurality of gas outlet openings through which gas provided by said gas generating material flows toward the air bag and a hermetically sealed canister disposed within said outer housing, said gas generating material being disposed in said canister, said auto ignition packet being disposed in said canister with said first metal layer disposed in engagement with said canister.

12. An apparatus for inflating an inflatable vehicle occupant restraint, said apparatus comprising:

a housing having an end wall;

gas generating material disposed within said housing to provide gas to inflate the inflatable vehicle occupant restraint when said gas generating material is ignited;

an auto ignition packet disposed within said housing and containing material having an ignition temperature below the ignition temperature of said gas generating material; and an igniter connected with said end wall of said housing and extending through said auto ignition packet, said igniter being actuatable to ignite said gas generating material.

13. An apparatus as set forth in claim 12 wherein said igniter includes a base connected with said wall of said housing and a casing connected with said base and formed of material which is ruptured to release hot combustion products upon actuation of said igniter, said auto ignition packet extending around said base of said igniter.

14. An apparatus as set forth in claim 12 wherein said auto ignition packet has an annular configuration about an axis and said igniter extends along said axis through a central opening in said auto ignition packet.

15. An apparatus as set forth in claim 12 wherein said auto ignition packet includes a first metal layer, a second metal layer which cooperates with said first metal layer to form a chamber to hold the material having an ignition temperature below the ignition temperature of said gas generating material, and connecting means for interconnecting said first and second metal layers.

16. An apparatus for inflating an inflatable vehicle occupant restraint, said apparatus comprising:

a housing;

gas generating material within said housing to provide gas to inflate the inflatable vehicle occupant restraint when said gas generating material is ignited; and an annular auto ignition packet within said housing, said annular auto ignition packet containing material having an ignition temperature below an ignition temperature of said gas generating material;

said housing including an outer housing having surface means for defining a plurality of gas outlet openings through which gas provided by said gas generating material flows toward the inflatable vehicle occupant restraint, and a hermetically sealed canister disposed within said outer housing, said gas generating material and said annular auto ignition packet being disposed within said canister.

17. An apparatus as set forth in claim 16 wherein said annular auto ignition packet includes a first annular metal layer, a second annular metal layer which cooperates with said first annular metal layer to form an annular chamber, and connector means for interconnecting the first and second annular metal layers, said material having an ignition temperature below the ignition temperature of said gas generating material being disposed in said annular chamber, said first annular metal layer of said auto ignition packet being disposed in engagement with an inner side surface of said canister.

18. An apparatus as set forth in claim 16 wherein said canister includes a cylindrical outer wall and a cylindrical inner wall which is disposed in a coaxial relationship with said cylindrical outer wall and which extends through a central opening in said annular auto ignition packet.

19. An apparatus as set forth in claim 18 further including an igniter which is at least partially enclosed by said cylindrical inner wall of said canister and which extends through the central opening in said annular auto ignition packet.

20. An apparatus as set forth in claim 16 wherein said outer housing includes a first end wall which is disposed adjacent to the inflatable vehicle occupant restraint prior to inflation of the inflatable vehicle occupant restraint and a second end wall which is opposite from the first end wall, said canister including a first end wall which is disposed adjacent to the first end wall of said outer housing and a second end wall which is disposed adjacent to said second end wall of said outer housing, said annular auto ignition packet being disposed in engagement with the second end wall of said canister.

21. An apparatus comprising:

a housing having a first end wall and a second end wall opposite from said first end wall;

an air bag connected with said housing and folded in a plurality of layers which extend across said first end wall of said housing, said first end wall of said housing being located between said second end wall of said housing and said plurality of layers of said air bag which extend across said first end wall of said housing;

gas generating material disposed within said housing to provide gas to inflate said air bag when said gas generating material is ignited; and an auto ignition packet, said auto ignition packet containing material having an ignition temperature below the ignition temperature of said gas generating material, said auto ignition packet being disposed within said housing between said gas generating material and said second end wall of said housing wherein heat is conducted through said second end wall of said housing to said auto ignition packet without being conducted through said plurality of layers of said air bag and without being conducted through said gas generating material;

said housing including an outer housing having surface means for defining a plurality of gas outlet openings through which gas provided by said gas generating material flows toward said air bag, and a hermetically sealed canister disposed within said outer housing, said gas generating material and said auto ignition packet being disposed in said hermetically sealed canister.

22. An apparatus as set forth in claim 21 wherein said first and second end walls of said housing are portions of said outer housing, said canister being disposed between said first and second end walls of said housing.

23. An apparatus as set forth in claim 22 wherein said canister includes an end wall formed of metal and disposed in engagement with said second end wall of said housing, said auto ignition packet being disposed in engagement with said end wall of said canister to enable heat to be conducted from an outer surface of said second end wall to said auto ignition packet along a heat flow path formed entirely of metal.

24. An apparatus for inflating an inflatable vehicle occupant restraint, said apparatus comprising:

a housing having an end wall;

gas generating material disposed within said housing to provide gas to inflate the inflatable vehicle occupant restraint when said gas generating material is ignited;

an auto ignition packet disposed within said housing and containing material having an ignition temperature below the ignition temperature of said gas generating material; and an igniter connected with said end wall of said housing and extending through said auto ignition packet, said igniter being actuatable to ignite said gas generating material;

said housing including an outer housing having surface means for defining a plurality of gas outlet openings through which gas provided by said gas generating material flows toward the inflatable vehicle occupant restraint, and a hermetically sealed canister disposed within said housing, said gas generating material and said auto ignition packet being disposed within said canister, said igniter being disposed outside of said canister.

25. An apparatus for inflating an inflatable vehicle occupant restraint, said apparatus comprising:

a housing having an end wall;

gas generating material disposed within said housing to provide gas to inflate the inflatable vehicle occupant restraint when said gas generating material is ignited;

an auto ignition packet disposed within said housing and containing material having an ignition temperature below the ignition temperature of said gas generating material; and an igniter connected with said end wall of said housing and extending through said auto ignition packet, said igniter being actuatable to ignite said gas generating material;

said gas generating material including a plurality of disks of gas generating material, said igniter extending through at least some of said disks of gas generating material.

26. An apparatus for inflating an inflatable vehicle occupant restraint, said apparatus comprising:

a housing;

gas generating material within said housing to provide gas to inflate the inflatable vehicle occupant restraint when said gas generating material is ignited;

an annular auto ignition packet within said housing, said annular auto ignition packet containing material having an ignition temperature below an ignition temperature of said gas generating material;

said gas generating material including a plurality of annular disks formed of gas generating material, said annular discs of gas generating material being disposed in a coaxial relationship with said annular auto ignition packet; and an igniter connected with said housing and actuatable to ignite said annular disks of gas generating material, said igniter extending through a central opening in said annular auto ignition packet and through central openings in said plurality of said annular disks of gas generating material.

* * * * *